United States Patent
Schmid

(10) Patent No.: US 6,662,720 B1
(45) Date of Patent: Dec. 16, 2003

(54) APPARATUS FOR ADJUSTING THE POSITION OF A CYLINDRICAL IMAGE CARRIER RELATIVE TO A SCANNING HEAD AND A METHOD FOR ADJUSTING THE POSITION OF A CYLINDRICAL IMAGE CARRIER RELATIVE TO A SCANNING HEAD

(75) Inventor: Gotthard Schmid, Malsch (DE)

(73) Assignee: Heidelberger Druckmaschinen Aktiengesellschaft, Heidelberg (DE)

( * ) Notice: Subject to any disclaimer, the term of this patent is extended or adjusted under 35 U.S.C. 154(b) by 0 days.

(21) Appl. No.: 09/421,586

(22) Filed: Oct. 20, 1999

(30) Foreign Application Priority Data

Oct. 21, 1998 (DE) .......................... 198 48 455

(51) Int. Cl.⁷ ........................... B41F 13/32; B41F 13/20
(52) U.S. Cl. .................. 101/216; 101/463.1; 101/401.1
(58) Field of Search ................ 101/218, 216, 101/483, 401.1, 463.1, 465, 467

(56) References Cited

U.S. PATENT DOCUMENTS 5,385,092 A * 1/1995 Lewis et al. ................ 101/467
5,481,972 A * 1/1996 Schmid ....................... 101/216
5,713,287 A * 2/1998 Gelbart ....................... 101/467
6,164,204 A * 12/2000 Kawada et al. ........... 101/415.1

FOREIGN PATENT DOCUMENTS

| DE | 231433 A1 | 12/1985 |
| DE | 3406629 | 2/1987 |
| JP | 2576474 | 3/1988 |

* cited by examiner

Primary Examiner—Leslie J. Evanisko
(74) Attorney, Agent, or Firm—Nils H. Ljungman & Associates

(57) ABSTRACT

An apparatus for adjusting the position of a cylindrical image carrier relative to a scanning head is designed to cheaply and easily permit substantially reliable positioning. In the apparatus for adjusting the position of a cylindrical image carrier relative to a scanning head, in which apparatus the image carrier is mounted so as to be rotatable around its longitudinal axis, the image carrier can be swiveled around an axis perpendicular to the longitudinal axis. The invention can be applied to devices that generate images and to devices that reproduce images, in particular for the production of type forms and for the scanning of originals.

14 Claims, 5 Drawing Sheets

APPARATUS FOR ADJUSTING THE POSITION OF A CYLINDRICAL IMAGE CARRIER RELATIVE TO A SCANNING HEAD AND A METHOD FOR ADJUSTING THE POSITION OF A CYLINDRICAL IMAGE CARRIER RELATIVE TO A SCANNING HEAD

BACKGROUND OF THE INVENTION

1. Field of the Invention

The present invention relates to an apparatus for adjusting the position of a cylindrical image carrier relative to a scanning head.

2. Background Information

The present invention can be applied to devices that generate images and to devices that reproduce images, in particular for the production of type forms and for the scanning of originals.

It is known for the production of type forms inside or outside of printing presses that the material to be printed, such as a printing plate, with a surface coating suitable for printing is fastened to the outer surface of a cylinder and is brought into point contact with the material to be printed by means of a tool. The tool can be designed such that multiple dots are produced simultaneously. The tool can be located on a mounting which in order to cover the entire printable area can be positioned within a longitudinal guide in the axial direction of the cylinder as the cylinder rotates. With most printing devices, optimal function of the tool may only be possible within a narrow range of tool to media distances. It is therefore known to maintain a constant distance between the tool and the cylinder. The tool can be positioned in the radial direction, the cylinder as a whole can be moved toward the tool, or both elements can be positioned simultaneously. If a light source, e.g. a laser, is used as the tool, optical elements for shaping the beam, such as autofocus systems, can be located in the light path to ensure that a constant amount of energy is applied to a constant area of the material to be printed regardless of shape and positioning errors with the cylinder and the material to be printed. Autofocus systems based on strictly optical position sensors are unreliable when used under harsh conditions such as inside a printing press. Mechanical positioning of the tool and the material to be printed can be used in combination with optical shaping of the beam.

Every degree of freedom presented by the specific application can be utilized for the mechanical positioning of the tool and the material to be printed. DD 231433 A1, for example, discloses an arrangement for positioning a wafer in a lithographic projection system in which the projection system is fixed and the wafer can be displaced in two directions and rotated around three axes. A multiplicity of travel and position measuring systems and actuators are required for positioning; this is both costly and complex.

OBJECT OF THE INVENTION

An object of the present invention is to develop an apparatus for adjusting the position of a cylindrical image carrier relative to a scanning head that cheaply and easily permits substantially reliable positioning.

SUMMARY OF THE INVENTION

This object can be achieved by an apparatus for adjusting the position of a cylindrical image carrier relative to a scanning head, whereby the image carrier is mounted so as to be rotatable around its longitudinal axis, and wherein the image carrier is mounted such that it can be swiveled around an axis perpendicular to the longitudinal axis. The cylindrical image carrier can be positioned by means of a single swiveling movement, i.e. only a single actuator engaging at a single point is required. If the image carrier is the plate cylinder of a printing press, an existing apparatus for adjusting the diagonal or inclination register can be used as the actuator. Generally, no special actuators are required in this case.

The scanning head is a carrier for a tool for producing, modifying or erasing an image on the image carrier and/or a carrier for an element holding an image already on an image carrier. The term "tool" refers to all devices suitable for producing an image, such as shaping tools, cutting tools or devices for modifying the surface characteristics of the material to be printed. One example could be semiconducting laser diodes that can be positioned substantially equidistant from one another along the surface line of a cylindrical image carrier. In this case, the semiconducting laser diodes can be moved a distance equivalent to the distance between the diodes toward the axis of the image carrier. Also suitable for use as a tool can be a single semiconducting laser that can be positioned over the length of the cylindrical image carrier, downstream of which is located a light valve arrangement facing the surface of the image carrier. It can also be possible to position the scanning head parallel to the axis of a cylinder holding an image or the material to be printed. It is also possible for the scanning head to be swivel-mounted at some distance from the image carrier, whereby the image holder or the direction of effect of the tool can be inclined toward the surface of the image carrier.

The above discussed embodiments of the present invention will be described further hereinbelow with reference to the accompanying figures. When the word "invention" is used in this specification, the word "invention" includes "inventions", that is, the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

Advantageous embodiments of the invention are disclosed in the features.

BRIEF DESCRIPTION OF THE DRAWINGS

At least one embodiment of the current invention is described in greater detail below with reference to attached drawings, wherein.

DESCRIPTION OF THE PREFERRED EMBODIMENT

Figure 1:
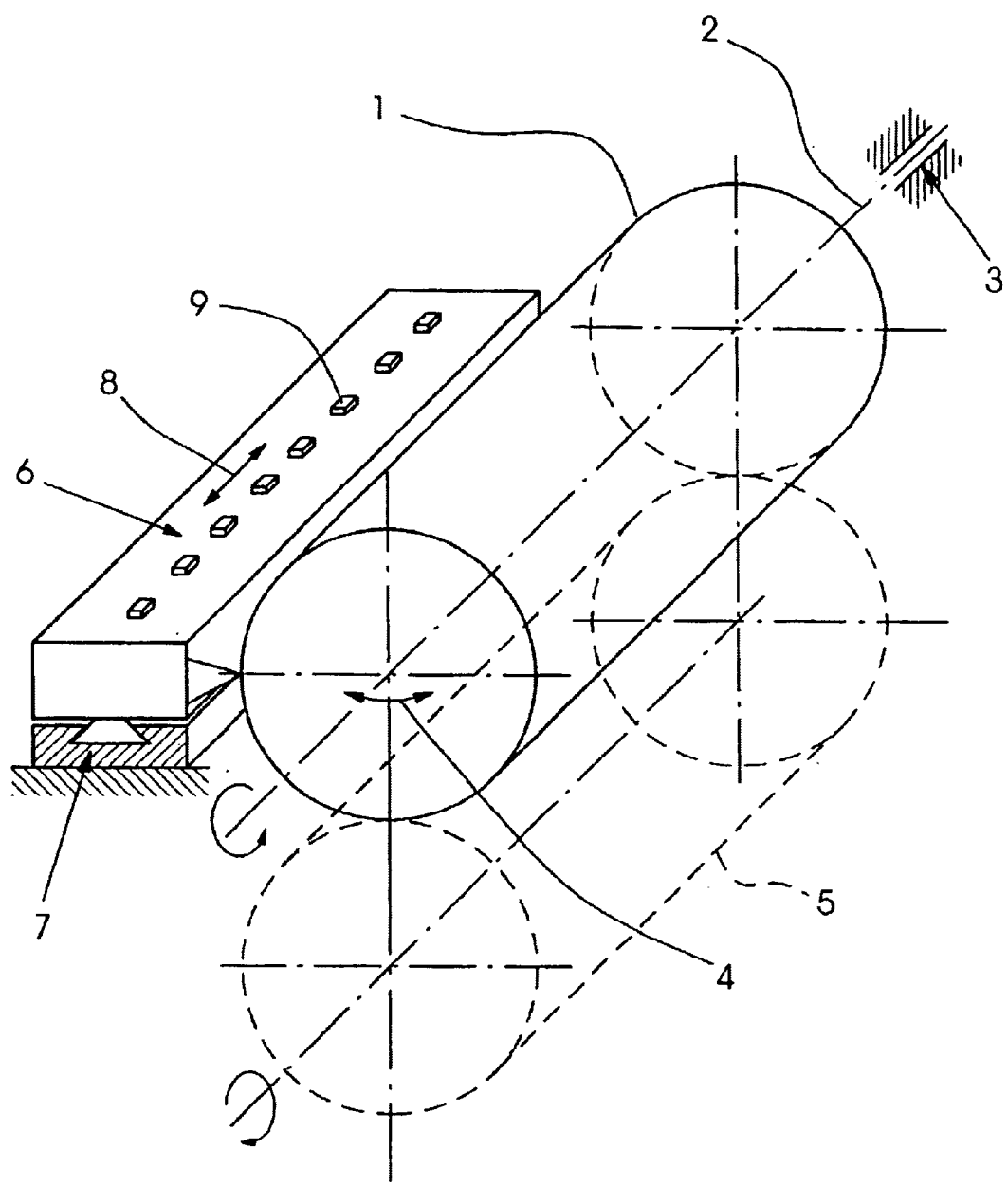
FIG. 1 shows a schematic of a printing unit of a printing press.

FIG. 1 shows a portion of the printing group or unit of an offset printing press. A plate cylinder 1 serves as the image carrier. A removable printing plate with a printable material can be mounted on the surface of the plate cylinder 1. In a plateless system, the material to be printed can also be applied directly to the surface of the plate cylinder 1, or, alternatively, the uppermost layer of the plate cylinder 1 can be the printable layer. The plate cylinder 1 is mounted on both ends in the machine frame of the sheet fed printing press. A shaft 2 of the plate cylinder 1 is seated on one end in a fixed bearing 3. The other end of the plate cylinder 1 is seated in a swivel bearing which is not shown in greater detail. This bearing can be swiveled in direction 4, which is substantially perpendicular to a plane defined by the axes of the plate cylinder 1 and a transfer cylinder 5 that is in rolling contact with the plate cylinder 1. The transfer cylinder 5 can be lowered against and raised from the plate cylinder 1. During printing, the transfer cylinder 5 is raised from the plate cylinder 1. A print head 6 is associated with the plate cylinder 1. The print head 6 is mounted in a longitudinal guide 7. The longitudinal guide 7 allows the print head 6 to be moved in a direction 8 that is parallel to the axes of the transfer cylinder 5 or the plate cylinder 1. Semiconducting laser diodes 9 are mounted in the print head 6 such as to be substantially equidistant from one another in direction 8. The semiconducting laser diodes 9 emit light in a direction substantially perpendicular to the axis of the plate cylinder 1. Laser light is only emitted when the image in the printing material in the plate cylinder 1 indicates that a dot must be produced. The rotation of the plate cylinder 1 and the displacement of the print head 6 must be synchronized with the image data used for printing.

The positioning of the plate cylinder 1 relative to the print head 6 is described in greater detail below with reference to FIG. 2. To realize the swivel motion in direction 4, the shaft 2 of the plate cylinder 1 is coupled to a linear drive 10. This can be the same drive that sets the diagonal or inclination register during printing. The linear drive 10 is incorporated into a register system for adjustment of the registers. A stepped motor or a motor with gearbox and shaft encoder can be used as the linear drive 10. The linear drive 10 is connected to an electronic controller 11. By means of the linear drive 10, that end of the plate cylinder 1 engaged by the linear drive 10 can be swiveled by about +/−1 mm out of the plane defined when the machine is at rest by the axes of rotation of the plate cylinder 1 and the transfer cylinder 5. The swivel pin of the plate cylinder 1 is seated in bearing 3. A sensor for the distance of the semiconducting laser diodes 9 from the surface of the plate cylinder 1 is integrated into the print head 6, and the signal output for the measured distance $x_{ist}$ of this sensor is connected to the electronic controller 11. At each position of the print head 6 in direction 8, the respective currently measured value $x_{ist}$ is compared with the specified value $x_{soll}$ for the distance. If the measured value $x_{ist}$ deviates impermissibly from a specified value $x_{soll}$ entered in a setpoint device 13, the plate cylinder 1 is then swiveled by the linear drive 10 in direction 4A or 4B depending on the sign of the comparison value ($x_{soll}-x_{ist}$). The swivel direction 4 can change during one rotation of the plate cylinder 1 if the plate cylinder 1 is imperfectly shaped or in the event of runout errors. Controlling the spacing essentially ensures that the dots produced are always substantially in the proper position and of the substantially proper size.

Figure 2:
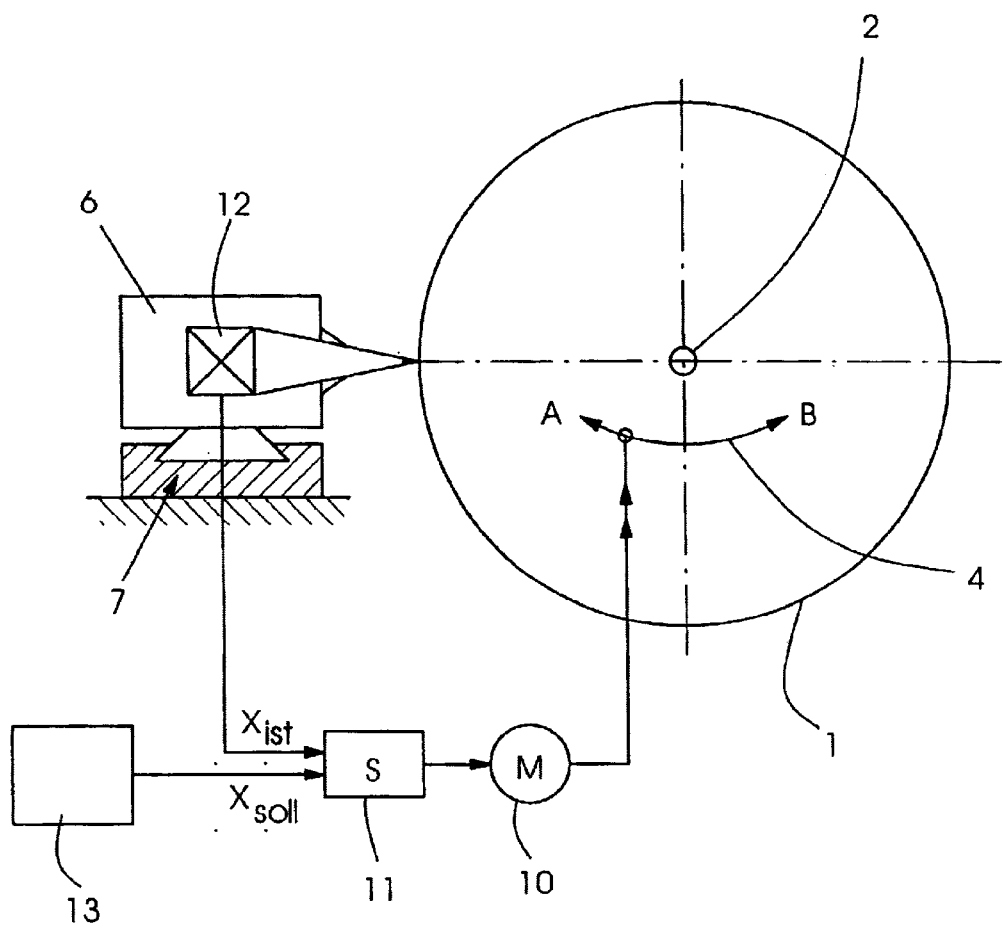
FIG. 2 shows a schematic for controlling the positioning of a print head.
Figure 3:
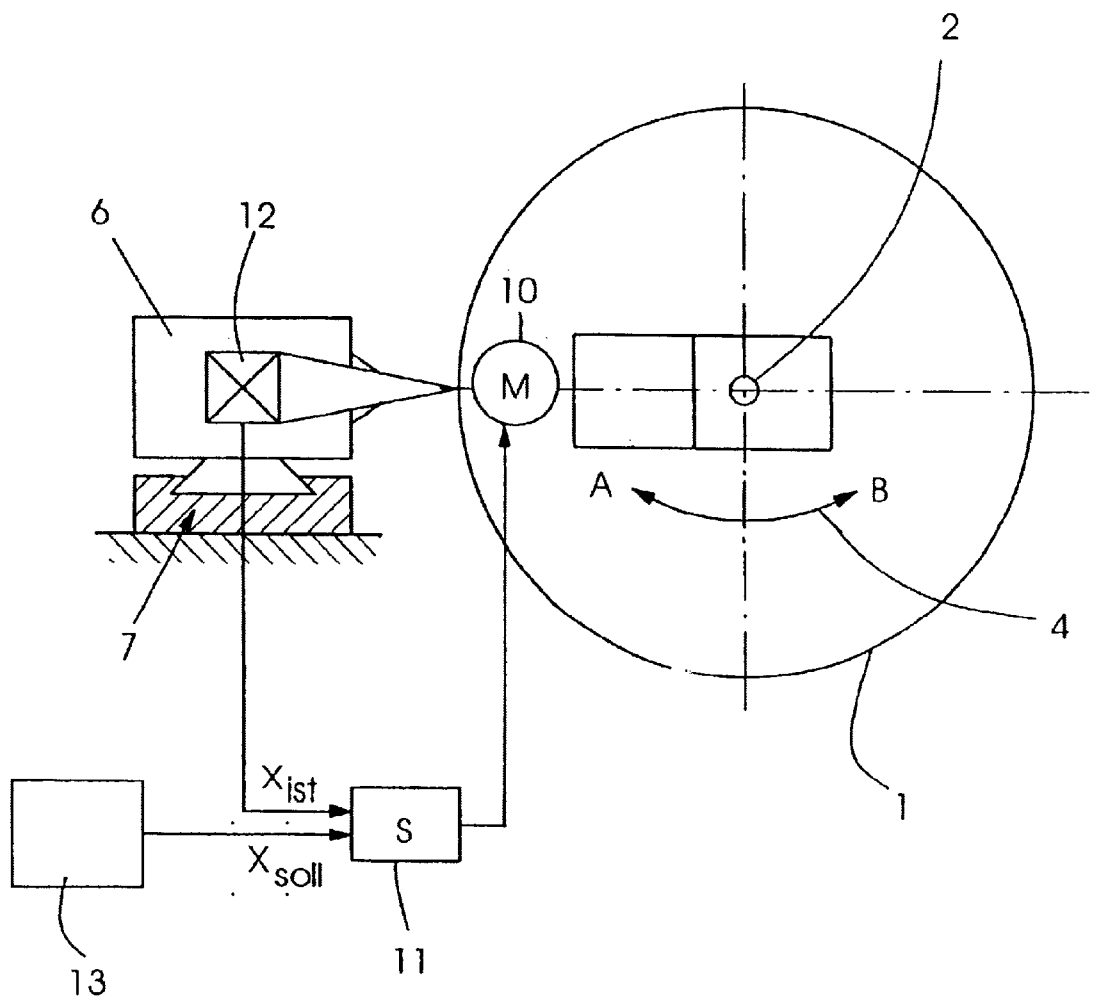
FIG. 3 shows a variant of the schematic for controlling the positioning of a print head shown in FIG. 2.

FIG. 3 shows a variant of the schematic diagram shown in FIG. 2 wherein the motor is placed adjacent to the press.

The invention is not restricted to the described embodiment. In one variant of the invention, the actuators for a swiveling movement can also engage the plate cylinder 1 on both ends. The positioning range of the plate cylinder can thus be enlarged and the positioning time reduced. The invention can also be used for the production of type forms and the scanning of images outside of printing presses, e.g. in plate and film image setters and in drum scanners.

In another variant in which the plate cylinder 1 can be swiveled around a bearing 3, two sensors 12 for the distance of the print head 6 from the surface of the plate cylinder 1 are located at the edge of the surface to be printed toward the axis of the plate cylinder 1. This enables measurement of the distances to correct for runout errors during one rotation of the plate cylinder 1. Positioning of the plate cylinder 1 with the linear drive 10 can be realized such that the plate cylinder 1 always assumes a specified position at the measuring site of the two sensors during printing.

In at least one embodiment of the present invention, the bearing can be mounted on the linear drive to adjust the bearing. Also in at least one embodiment, the motor can be connected to the linear drive to adjust the position of the shaft.

Figure 4:
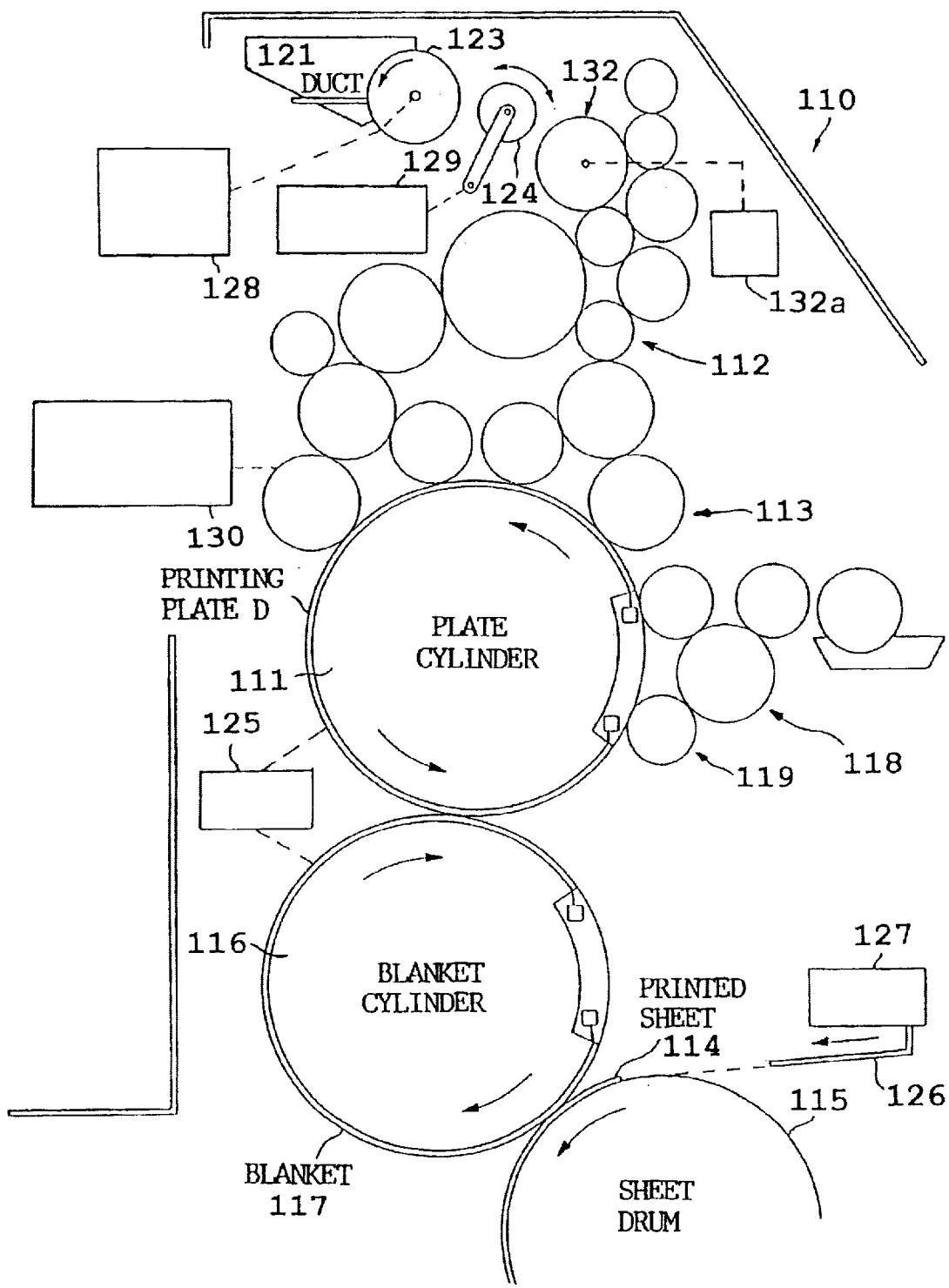
FIG. 4 shows a printing press.

FIG. 4 illustrates a rotary print stand 110 of a rotary printing press which can employ a distributor roller displacement arrangement. Rotary print stand 110 generally includes: a plate cylinder 111 for having mounted thereon a printing plate D; an inking unit 112 which includes ink applicator rollers 113 for applying ink to the printing plate an ink profile; a dampening (or wetting) unit 118 having dampening applicator rollers 119 for transferring a dampening agent to the printing plate D, a blanket cylinder 116 carrying a rubber blanket 117 for receiving an ink impression from the printing plate D, and a sheet drum 115 for carrying a printed sheet 114 onto which the ink impression carried by blanket 117 is transferred. A duct roller 123 is typically mounted adjacent to ink duct 121. Typically, ink is transferred from duct roller 123 to inking unit 112 by means of a vibrator roller 124 which oscillates to successively pick up ink from duct roller 123 and deposit the same on a roller 132 of inking unit 110. Typically, the printing stand 110 will also include auxiliary mechanisms such as, for example, a duct roller drive 128, a vibrator roller drive 129, a roller drive 132a an applicator roller throw-off 130 for lifting the ink applicator rollers 113 off of the printing plate, a press drive 125 and a sheet feed 127 for supplying the sheets to be printed 126 to sheet drum 115.

Figure 5:
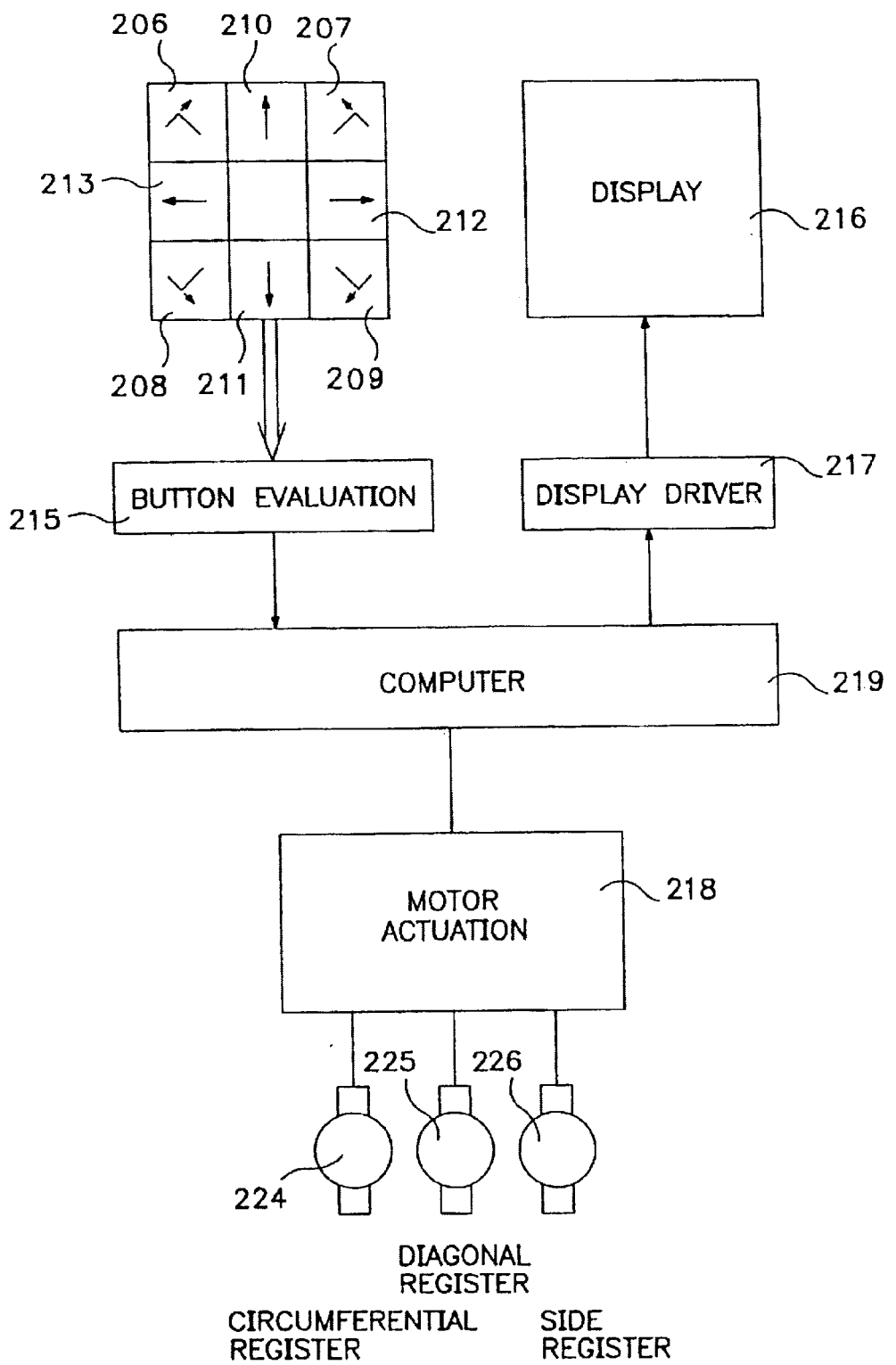
FIG. 5 shows a register system for a printing press.

FIG. 5 shows one embodiment of an arrangement which could incorporate control keys 206–213. In essence, such an arrangement could be provided as an accessory to, or a standard component of a printing press, or of an operator's control panel of a printing press. As depicted in FIG. 5, the control keys 206–213 could be electrically connected to a device 215 for evaluating which of the keys 206–213 has been depressed, or activated. This evaluation device can essentially be a known device commonly used for evaluation of a keyboard, or keypad to determine which button has been depressed, and then sending a signal, i.e., and electrical signal, corresponding to the depressed button to the microprocessor for selection of an appropriate program sequence.

Thus, by connecting the keys 206–213, via an evaluation device 215, to the microprocessor through an input port of the microprocessor, an appropriate electronic signal could then be sent from the device 215 to the computer, or processing unit 219 to enable the appropriate calculation algorithms for the selected key.

The computer 219 could then prompt the operator, via a display device 216 that is preferably operated via a display driver 217, for entry of values corresponding to the location of marks, and the measured value for the deviation of a mark from the ideal position. Such a display device could be a full computer monitor, a display screen having only a few display lines, or even an output printer. Each of these display devices could be connected via an appropriate display drive, to an output port of the computer 219. Such display devices, and display drivers are generally well in the computer field and are therefor not explained in any greater detail herein.

Once the necessary values are entered the computer can then preferably calculate, based upon the selected deviation as chosen by depressing an appropriate button 206–213, the types of register movements that are needed to correct for the register of the printing plate, via the calculation algorithms as set forth above. Alternatively, the computer could be provided with a table of correction values specific to the printing plates used thereon. Such tables, alternatively called look-up tables, could cross-reference each deviation (a) with a distance (b) for a given printing plate, and the computer receiving the value (a) could then simply reference the appropriate table relating to the lateral positions of the points. After determining the value of (b) an appropriate electronic signal can be sent to an actuating device 218, to actuate positioning motors 224, 225 and 226 to provide the necessary movements of the circumferential, diagonal and/or side registers, respectively. Such servo-motors and feedback sensors are generally known as disclosed by U.S. Pat. No. 5,117,365 to Jeschke and Rodi, and are therefore not described in any greater detail herein.

Examples of motors for the linear drives may be procured from, for example, Maxon Precision Motors, Inc. 838 Mitten Road, Burlingame, Calif. 94010, phone 1-650-697-9614. Such motors could be, for example, Maxon parts nos.: RE010; 2312 (S Program); 12 mm dia. (A-max program); RE013; 2515 (A-program); RE016; 22 mm dia. (A-max program); 2140 (F program); EC022; EC040; or EC060.

Examples of gearboxes for the linear drives may be procured from, for example, Maxon Precision Motors, Inc. 838 Mitten Road, Burlingame, Calif. 94010, phone 1-650-697-9614. Such gearboxes could be, for example, Maxon parts nos.: 10 mm dia planetary 0.005–0.1 Nm torque; 12 mm dia. spur 0.01–0.02 Nm torque; 16 mm dia. spur 0.015 Nm torque; 24 mm dia. spur 0.1 Nm torque; 30 mm dia. spur 0.07–0.2 Nm torque; and 38 mm dia. spur 0.1–0.6 Nm torque.

Examples of apparatus for alignment of printing functions, which may be utilized in accordance with the embodiments of the present invention, may be found in the following "Apparatus for Adjusting the Movement of a Roller in a Printing Press", U.S. Pat. No. 5,701,817, issued to Thunker et al.; "Method and Apparatus for the Alignment of Printing Functions by Optical Beams Reflected from Sheets", U.S. Pat. No. 5,659,178, issued to Bucher et al.; and "Electronic Apparatus and Computer-Controlled Method for Alignment Correction", U.S. Pat. No. 5,649,484, issued to Broghammer et al.

Examples of roller bearings, which may be utilized in accordance with embodiments of the present invention, may be found in the following "Bearing Assembly for a Cylinder in a Printing Press", U.S. Pat. No. 4,252,059, issued to Simeth; "Device for Eliminating Effect of Bearing Play in Printing Press Cylinders", U.S. Pat. No. 4,149,461, issued to Simeth; "Roller Bearing Executing Swivel Motions with Device for the Synchronous Guidance of the Bearing Cage", U.S. Pat. No. 4,884,902, issued to Kispert et al.; "Serial Bearing Assembly", U.S. Pat. No. 4,618,271, issued to Li; "Swash Plate Swivel Bearing for a Hydraulic Axial Piston Machine", U.S. Pat. No. 4,858,480, issued to Rohde et al.; "Unitary Bearing Retainer for a Swashplate Bearing", U.S. Pat. No. 4,627,330, issued to Beck, Jr.; "Heavy-Duty Swivel Bearing", U.S. Pat. No. 4,072,372, issued to Korrenn et al.; "Ball and Socket Swivel Bearing", U.S. Pat. No. 5,775,815, issued to Abusamra; and "Swivel Bearing", U.S. Pat. No. 5,073,038, issued to O'Connell.

Examples of linear motors and movement mechanisms, which may be utilized in accordance with embodiments of the present invention, may be found in the following "Linear Drive for a Printing Apparatus", U.S. Pat. No. 4,149,808, issued to Matthias et al. on Apr. 17, 1979; "Method for Initializing the Position of a Linear Drive System", U.S. Pat. No. 5,638,268, issued to Souza on Jun. 10, 1997; "Backlash Compensated Linear Drive Method for Lead Screw-Driven Printer Carriage", U.S. Pat. No. 3,941,230, issued to Bellino et al. on Mar. 2, 1976; "Disengageable Linear Stepper Motor with Recentered Rotor", U.S. Pat. No. 5,019,732, issued to Spiesser on May 28, 1991; "Combined Linear-Rotary Direct Drive Step Motor", U.S. Pat. No. 5,093,596, issued to Hammer on Mar. 3, 1992; "Linear Motor", U.S. Pat. No. 5,130,583, issued to Andoh on Jul. 14, 1992; "Rotary to Linear Motion Converter", U.S. Pat. No. 4,941,367, issued to Konves on Jul. 17, 1990; "Linear Drive Device", U.S. Pat. No. 5,351,599, issued to Stoll on Oct. 4, 1994; "Pressure-Medium Activated Linear Drive System", U.S. Pat. No. 5,601,026, issued to Rothemeyer et al. on Feb. 11, 1997; "Linear Drive System", U.S. Pat. No. 5,819,584, issued to Evans on Oct. 13, 1998; "Electromagnetic Linear Drive", U.S. Pat. No. 5,809,157, issued to Grumazescu on Sep. 15, 1998; "Linear Drive Device", U.S. Pat. No. 5,949,161, issued to Nanba on Sep. 7, 1999; "Device for the Reciprocating Linear Drive of a Part", U.S. Pat. No. 4,642,839, issued to Urban on Feb. 17, 1987; "Linear Drive", U.S. Pat. No. 4,656,881, issued to Goedecke et al. on Apr. 14, 1987; "Linear Drive Unit", U.S. Pat. No. 4,648,325, issued to Gutekunst on Mar. 10, 1987; "Linear Motors", U.S. Pat. No. 5,091,665, issued to Kelly on Feb. 25, 1992; "Latching Linear Motor", U.S. Pat. No. 5,148,067, issued to LaSota on Sep. 15, 1992; "Controlled Linear Motor", U.S. Pat. No. 5,028,856, issued to Zannis on Jul. 2, 1991; "Mechanical Linear Drive System", U.S. Pat. No. 4,715,241, issued to Lipinski et al. on Dec. 29, 1987; "Linear Pulse Motor with Magnetic Armature Lock", U.S. Pat. No. 4,999,530, issued to Azuma et al. on Mar. 12, 1991; "Movement Guiding Mechanism", U.S. Pat. No. 4,916,340, issued to Negishi on Apr. 10, 1990; "Linear Drive for Converting a Rotational Drive Movement into a Linear Output Movement", U.S. Pat. No. 5,331,862, issued Jul. 26, 1994; "Linear-Drive Cylinder", U.S. Pat. No. 5,507,218, issued to Lipinski on Apr. 16, 1996; "Linear Drive Device", U.S. Pat. No. 4,703,666, issued to Fickler on Nov. 3, 1987; "Linear Drive System", U.S. Pat. No. 4,887,477, issued to Hauser et al. on Dec. 19, 1989; "Electro-magnetic Linear Drive", U.S. Pat. No. 4,931,677, issued to Heidelberg et al. on Jun. 5, 1990; "Linear Drive with Screw and Threaded Follower", U.S. Pat. No. 5,906,137, issued to Zelechonok on May 25, 1999; "Lead Screw and Linear Drive Assemblies Using Such Lead Screw", U.S. Pat. No. 5,551,314, issued to Andrzejewski, Jr. et al. on Sep. 3, 1996; "Linear Drive", U.S. Pat. No. 5,016,519, issued to Goedecke et al. on May 21, 1991; "Linear Drive", U.S. Pat. No. 5,330,272, issued to Stoll on Jul. 19, 1994; "Rotary to Linear Drive Unit", U.S. Pat. No. 5,121,019, issued to Pradler on Jun. 9, 1992; "Linear Actuators and Linear Drive Systems", U.S. Pat. No. 5,053,660, issued to Sneddon on Oct. 1, 1991; "Linear Drive", U.S. Pat. No. 4,573,369, issued to Horn on Mar. 4, 1986; "Electric Linear Drive with an External Rotor Electric Motor", U.S. Pat. No. 4,560,894, issued on Dec. 24, 1985; "Slidable Brush and Screw Linear Drive Arrangment", U.S. Pat. No. 4,345,515, issued to Holt on Aug. 24, 1982; "Reciprocating Linear Drive Mechanism", U.S. Pat. No. 4,180,766, issued to Matula on Dec. 25, 1979; "Electromagnetic Linear Drive", U.S. Pat. No. 4,686,435, issued to Heidelberg et al. on Aug. 11, 1987; "Position Sensors for Linear Motors Including Plural Symmetrical Fluxes Generated by a Planar Drive Coil and Received by Planar Sense Coils Being Colinear Along an Axis of Motion", U.S. Pat. No. 5,434,504, issued to Hollis et al. on Jul. 18, 1995; "Linear Motor", U.S. Pat. No. 4,965,864, issued to Roth et al. on Oct. 23, 1990; "Linear Drive Device with Two Motors", U.S. Pat. No. 4,614,128, issued to Fickler on Sep. 30, 1986; "Linear Drive Device with Two Motors", U.S. Pat. No. 4,494,025, issued to Fickler on Jan. 15, 1985; "Linear Motor Type Handling Device Including Mobile Elements Travelling over a Network", U.S. Pat. No. 5,476,047, issued to Sebillaud on Dec. 19, 1995; "Linear Drive Motor Multiple Carrier Control System", U.S. Pat. No. 4,633,148, issued to Prucher on Dec. 30, 1986; and "Linear Motor Control System and Method of Use", U.S. Pat. No. 5,416,397, issued to Mazzara et al. on May 16, 1995.

Examples of general concepts and principles relating to linear motors may be found in the following U.S. Pat. No. 5,118,055, issued to Veraart on Jun. 2, 1992; U.S. Pat. No. 5,085,480, issued to Jackson on Feb. 4, 1992; U.S. Pat. No. 5,002,020, issued to Kos on Mar. 26, 1991; U.S. Pat. No. 4,987,927, issued to Kluczynski on Jan. 29, 1991; U.S. Pat. No. 5,416,753, issued to Kanazawa et al. on May 16, 1995; U.S. Pat. No. 5,141,082, issued to Ishii et al. on Aug. 25, 1992; U.S. Pat. No. 5,105,109, issued to Nakai et al. on Apr. 14, 1992; and U.S. Pat. No. 5,083,745, issued to Tischer on Jan. 28, 1992.

An example of a device for controlling registration may be found in the following "Device for Adjusting the Circumferential Register at Rotary Printing Machines", U.S. Pat. No. 5,249,522, issued to Kusch et al. on Oct. 5, 1993.

One feature of the invention resides broadly in the apparatus for adjusting the position of a cylindrical image carrier relative to a scanning head whereby the image carrier is mounted so as to be rotatable around its longitudinal axis, characterized by the fact that the image carrier 1 is mounted such that it can be swiveled around an axis perpendicular to the longitudinal axis 2.

Another feature of the invention resides broadly in the apparatus characterized by the fact that the image carrier 1 is located on the plate cylinder 1 of a printing press and that the plate cylinder 1 is mounted in the side walls of the printing press, whereby at least one of the bearings is connected to an actuator 10 that swivels the cylinder 1 in one of the bearings 3.

Yet another feature of the invention resides broadly in the apparatus characterized by the fact that the actuator is electively connected to an arrangement 11, 12, 13 for setting the position of the cylinder 1 relative to the scanning head 6 or to an arrangement for setting the registers of the printing press.

Still another feature of the invention resides broadly in the apparatus characterized by the fact that the arrangement for setting the position includes a measuring device 12 for the distance ($x_{ist}$) between the scanning head 6 and the plate cylinder 1, a setpoint device 13 for the specified value ($x_{soll}$) for the distance and a control circuit 11, whereby the scanning head 6 can be displaced essentially parallel to the axis of rotation 2 of the cylinder 1.

A further feature of the invention resides broadly in the apparatus characterized by the fact that two fixed sensors 12 for the distance ($x_{ist}$) are provided at the edge of the surface of the image carrier 1 to be scanned by the scanning head to determine the position of the image carrier 1 relative to the scanning head 6.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. 198 48 455.0, filed on Oct. 21, 1998, having inventor Gotthard Schmid, and DE-OS 198 48 455.0 and DE-PS 198 48 455.0, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

Examples of printing presses and components thereof which may be used in the present invention may be found in the following U.S. Pat. Nos. 5,701,817, issued Dec. 30, 1997; U.S. Pat. No. 5,659,178, issued Aug. 19, 1997; U.S. Pat. No. 5,649,484, issued Jul. 22, 1997; U.S. Pat. No. 5,619,922, issued Apr. 15, 1997; U.S. Pat. No. 5,713,280, issued Feb. 3, 1998; U.S. Pat. No. 5,845,576, issued Dec. 8, 1998; U.S. Pat. No. 5,230,284, issued Jul. 27, 1993; U.S. Pat. No. 5,107,761, issued Apr. 28, 1992; and U.S. Pat. No. 5,003,874, issued Apr. 2, 1991.

Examples of swivel bearings that may be used in embodiments of the present invention may be found in the following U.S. Patents:

The details in the patents, patent applications and publications may be considered to be incorporable, at applicant's option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

PARTIAL LIST OF REFERENCES

1 Plate cylinder
2 Shaft
3 Bearing
4 Direction
5 Transfer cylinder
6 Print head
7 Longitudinal guide
8 Direction
9 Semiconducting laser diodes
10 Linear drive
11 Electronic controller
12 Sensor(s)
13 Setpoint device

What is claimed is:

1. A device for adjusting the position of a cylindrical image carrier, said device comprising:

a cylindrical image carrier;

said cylindrical image carrier being configured to carry an image;

said cylindrical image carrier having a longitudinal axis of rotation;

an apparatus to mount said image carrier so as to be rotatable around said longitudinal axis of rotation; and a scanning head arrangement configured and disposed to scan said image on said image carrier; and an apparatus disposed and configured to carry said scanning head arrangement adjacent said cylindrical image carrier; and said mounting apparatus comprising an arrangement to permit at least one end of said image carrier to swivel, said swivel arrangement being configured to swivel at least one end of said image carrier perpendicular to said longitudinal axis of rotation of said image carrier.

2. The device according to claim 1 including:

a control arrangement operatively connected to said scanning head arrangement and operatively connected said swivel arrangement to receive a signal from said scanning head arrangement and to transmit a signal to said swivel arrangement to align the registration of said image on said image carrier to a desired registration.

3. The device according to claim 2 wherein said swivel arrangement is operatively connected to one end of said cylindrical image carrier to adjust the position of said image carrier relative to said scanning head arrangement.

4. The device according to claim 3 wherein said scanning head arrangement includes:

a sensor arrangement;

said sensor arrangement being configured and disposed to evaluate the actual position of said image carrier relative to said scanning head arrangement from a predetermined set position;

a setpoint arrangement to preselect the specified value of position for said image carrier relative to said scanning head arrangement; and said control arrangement comprising a control circuit, said control circuit being configured to adjust the registration of said image carrier relative to said scanning head arrangement.

5. The device according to claimed 4 wherein said control arrangement comprises an arrangement being selectively configured to set the registration of said image carrier and at least one portion of said image carrier.

6. The device according to claim 5 wherein said control circuit comprises an electronic controller, said electronic controller comprising a computer to automatically control adjustment of the position of said cylindrical image carrier relative to said scanning head.

7. The device according to claim 6 wherein said scanning head arrangement is configured to be positioned substantially parallel to at least one of: said image carrier, a cylinder holding an image, or the material to be printed.

8. The device according to claim 7 and further comprising:

apparatus to set the registration in a printing press;

said swivel arrangement being selectively connectable to one of: said apparatus to set the registration in a printing press and at least one side of said image carrier; and said swivel arrangement including at least one linear motor to swivel said image carrier to a position corresponding to a predetermined set position.

9. The device according to claim 8 wherein said sensor arrangement comprises two fixed sensors to determine the actual distance between said image carrier and said scanning head arrangement;

said two fixed sensors being disposed to sense a predetermined portion of the surface of said image carrier to be scanned by said scanning head arrangement to determine the position of said image carrier relative to said scanning head arrangement.

10. The device according to claim 9 and further comprising one of: an arrangement to produce an image on said image carrier, an arrangement to modify an image on said image carrier, and an arrangement to erase an image on said image carrier.

11. A method for adjusting the position of a cylindrical image carrier, said method comprising the steps of:

(a) providing a cylindrical image carrier;

said cylindrical image carrier being configured to carry an image;

said cylindrical image carrier having a longitudinal axis of rotation;

(b) providing an apparatus to mount said image carrier so as to be rotatable around said longitudinal axis of rotation; and (c) providing a scanning head arrangement configured and disposed to at least scan said image on said image carrier;

(d) providing an actuator arrangement connectable to said cylindrical image carrier;

(e) providing an apparatus disposed and configured to carry said scanning head arrangement adjacent said cylindrical image carrier; and said method further comprising the step of:

(f) displacing said image carrier in said mounting apparatus relative to said scanning head arrangement by swiveling said image carrier perpendicular to said longitudinal axis of rotation of said image carrier to move said image carrier from an initial position to a desired position; and (g) aligning a registration of said image on said image carrier to a desired registration.

12. The method according to claim 11 and further including the step of:

(h) controlling said displacing step with a computer, said computer automatically controlling the moving of said image carrier to said desired position.

13. The method according to claim 12 and further including the steps of:

(i) adjusting the registration of said cylindrical image carrier relative to said scanning head arrangement by selectively setting the registration of said image carrier and at least one portion of said image carrier;

(j) adjusting with said actuator arrangement one end of cylindrical image carrier to adjust the position of said image carrier relative to said scanning head arrangement;

(k) providing a sensor arrangement, said sensor arrangement being configured and disposed to evaluate the actual position of said image carrier relative to said scanning head arrangement from a predetermined set position;

said sensor arrangement comprising two fixed sensors to determine the actual distance between said image carrier and said scanning head arrangement;

said two fixed sensors being disposed to sense a predetermined portion of the surface of said cylindrical image carrier to be scanned by said scanning head arrangement to determine the position of said image carrier relative to said scanning head arrangement;

(l) providing a setpoint arrangement to set the specified value of position for said cylindrical image carrier relative to said scanning head arrangement;

(m) providing a control arrangement operatively connected to said scanning head arrangement and operatively connected to said actuator arrangement to receive a signal from said scanning head arrangement and to transmit a signal to said actuator arrangement, to align the registration of said cylindrical image carrier to a desired registration;

said control arrangement comprising a control circuit, said control circuit being configured to adjust the registration of said image carrier relative to said scanning head arrangement;

said control arrangement comprising an arrangement being selectively configured to set the registration of said image carrier and at least one portion of said image carrier;

(n) sensing with said sensor arrangement a predetermined portion of the surface of said cylindrical image carrier; and (o) preselecting with said setpoint arrangement the specified value of position for said cylindrical image carrier relative to said scanning head arrangement.

14. The method according to claim 13 and further comprising the steps of:

(p) receiving a signal from said scanning head arrangement; and (q) transmitting a signal to said actuator arrangement, to align the registration of said cylindrical image carrier to a desired registration.

* * * * *

UNITED STATES PATENT AND TRADEMARK OFFICE
CERTIFICATE OF CORRECTION

PATENT NO.   : 6,662,720 B1
DATED        : December 16, 2003
INVENTOR(S)  : Gotthard Schmid It is certified that error appears in the above-identified patent and that said Letters Patent is hereby corrected as shown below:

<u>Title page, Item [54] and Column 1, line 7,</u>
Title, after "HEAD" insert -- AND A METHOD OF USING THE APPARATUS --.

<u>Column 4,</u>
Line 41, after "132a" insert -- , --.

<u>Column 9,</u>
Line 62, after "to" delete "claimed" and insert -- claim --.

Signed and Sealed this

Sixth Day of April, 2004

JON W. DUDAS
*Acting Director of the United States Patent and Trademark Office*